United States Patent
Wang et al.

(10) Patent No.: US 10,451,744 B2
(45) Date of Patent: Oct. 22, 2019

(54) DETECTING USER ACTIVITY BASED ON LOCATION DATA

(71) Applicant: Apple Inc., Cupertino, CA (US)

(72) Inventors: Lei Wang, Cupertino, CA (US); Isaac Thomas Miller, El Granada, CA (US); Hyojoon Bae, San Jose, CA (US); Christina Selle, Los Altos, CA (US); Glenn Donald MacGougan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 15/613,039

(22) Filed: Jun. 2, 2017

(65) Prior Publication Data

US 2018/0349728 A1    Dec. 6, 2018

(51) Int. Cl.
| | |
|---|---|
| *G01S 5/02* | (2010.01) |
| *G01S 19/19* | (2010.01) |
| *G01S 19/49* | (2010.01) |
| *G06K 9/00* | (2006.01) |
| *G06K 9/46* | (2006.01) |
| *G06K 9/62* | (2006.01) |
| *G06T 7/277* | (2017.01) |

(52) U.S. Cl.
CPC .......... *G01S 19/19* (2013.01); *G01S 5/0294* (2013.01); *G01S 19/49* (2013.01); *G06K 9/00342* (2013.01); *G06K 9/4604* (2013.01); *G06K 9/6202* (2013.01); *G06T 7/277* (2017.01); *G06T 2207/30196* (2013.01)

(58) Field of Classification Search
None
See application file for complete search history.

(56) References Cited

U.S. PATENT DOCUMENTS

| | | | |
|---|---|---|---|
| 8,265,870 B1 * | 9/2012 | Nguyen | G01V 1/24 |
| | | | 701/450 |
| 9,052,202 B2 | 6/2015 | Riley | |
| 9,415,265 B2 * | 8/2016 | Aaron | A63B 24/0006 |
| 10,024,679 B2 * | 7/2018 | Moore | G06F 3/167 |
| 2007/0086622 A1 * | 4/2007 | Sun | G06K 9/32 |
| | | | 382/103 |

(Continued)

FOREIGN PATENT DOCUMENTS

WO    WO 2015/079436    6/2015

OTHER PUBLICATIONS

Lyra et al., "Filtering in SPECT Image Reconstruction," International Journal of Biomedical Imaging, vol. 2011, Article ID: 693795 (Year: 2011).*

(Continued)

*Primary Examiner* — Soo Shin
(74) *Attorney, Agent, or Firm* — Jaffery Watson Mendonsa & Hamilton LLP

(57) ABSTRACT

The disclosed embodiments are directed to detecting a user activity based on patterns in location data. In an embodiment, a method comprises: obtaining, by a processor of a computing device, location data; detecting, by the processor, a pattern in the location data; determining, by the processor and based on the detected pattern, an activity associated with a mobile device; and adjusting, by the processor, one or more parameters of a location data filter configured to process the location data.

22 Claims, 6 Drawing Sheets

(56) References Cited

U.S. PATENT DOCUMENTS

| | | | | |
|---|---|---|---|---|
| 2013/0064471 | A1* | 3/2013 | Kluzner | G06K 9/32 382/294 |
| 2013/0288702 | A1* | 10/2013 | Abu-Alqumsan | G06F 17/30247 455/456.1 |
| 2014/0039841 | A1* | 2/2014 | Yuen | A61B 5/6838 702/189 |
| 2016/0054449 | A1 | 2/2016 | Pekonen et al. | |
| 2016/0263435 | A1 | 9/2016 | Venkatraman et al. | |
| 2016/0334433 | A1 | 11/2016 | Kazemi et al. | |
| 2016/0349376 | A1 | 12/2016 | Kazemi et al. | |
| 2017/0074988 | A1* | 3/2017 | Kitchel | G01S 19/14 |

OTHER PUBLICATIONS

Flusser, "On the independence of rotation moment invariants," Pattern Recognition, Sep. 1, 2000, 33(9):1405-1410.
Hu, "Visual Pattern Recognition by Moment Invariants," IRE Trans. Info. Theory, vol. IT-8, Feb. 1962, 8(2):179-87.

* cited by examiner

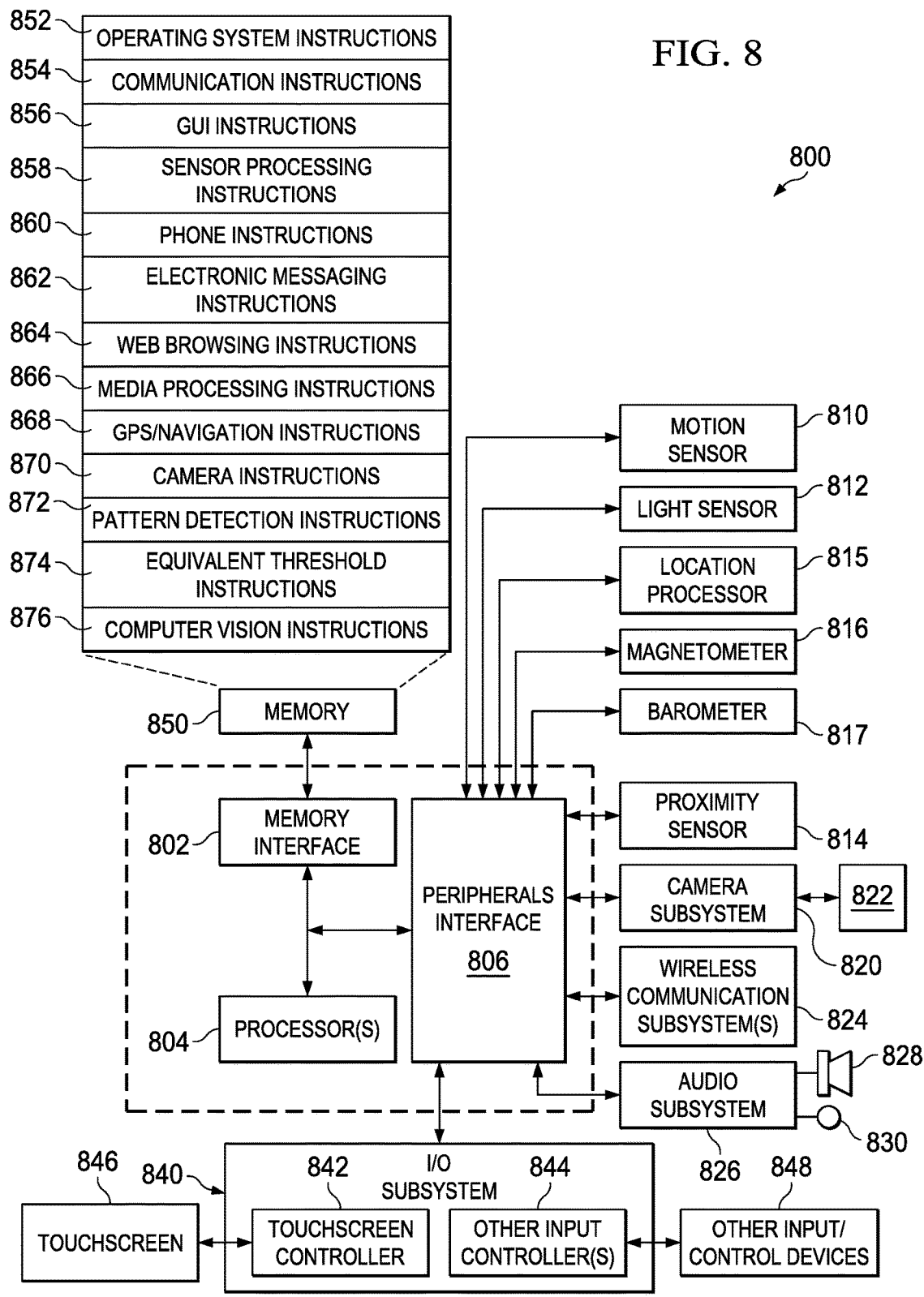

DETECTING USER ACTIVITY BASED ON LOCATION DATA

TECHNICAL FIELD

This disclosure relates generally to mobile device location determination.

BACKGROUND

Many mobile devices, such as smart phones, tablet computers and wearable devices (e.g., smart watches), have navigation applications that depend on global navigation satellite system (GNSS) data. The GNSS data is used by a filter running on the mobile device to estimate a position and velocity of the mobile device in a reference coordinate system. The filter smooths the GNSS data to remove outlier data. In some cases, the smoothing that is applied maybe too strong or too weak, resulting in a poor estimate of position and velocity by the filter. For example, if an individual is running fast around a loop or running track the individual may take sharp corners and/or make rapid changes in direction. If too much smoothing is applied to the GNSS data by the filter, the quick changes in direction may be removed by the filter, resulting in a less accurate estimate of the individual's motion path. If the inaccurate position is used by a fitness application to plot the motion path of the individual on the mobile device, the motion path may look significantly different than the actual motion path.

SUMMARY

The disclosed embodiments are directed to detecting user activity based on patterns in location data.

In an embodiment, a method comprises: obtaining, by a processor of a computing device, location data; detecting, by the processor, a pattern in the location data; determining, by the processor and based on the detected pattern, an activity associated with a mobile device; and adjusting, by the processor, one or more parameters of a location data filter configured to process the location data.

In an embodiment, a system comprises: one or more processors; memory coupled to the one or more processors and configured to store instructions, which, when executed by the one or more processors, causes the one or more processor to perform operations comprising: obtaining location data; detecting a pattern in the location data; determining an activity associated with a mobile device based on the detected pattern; and adjusting one or more parameters of a location data filter configured to process the location data.

In an embodiment, a method comprises: generating, by one or more processors of a computing device, an image of location data; determining, by the one or more processors, a contour in the image, the contour representing an activity path associated with a mobile device; determining, by the one or more processors, a path descriptor for the activity path; matching, by the one or more processors, the path descriptor with one of a plurality of reference path descriptors; responsive to the matching, adjusting, by the one or more processors, one or more parameters of a location data filter; and filtering, by the location data filter, the location data.

In an embodiment, a system comprises: one or more processors; memory coupled to the one or more processors and configured to store instructions, which, when executed by the one or more processors, cause the one or more processors to perform operations comprising: generating an image of location data; determining a contour in the image, the contour representing an activity path associated with a mobile device; determining a path descriptor for the activity path; matching the path descriptor with one of a plurality of reference path descriptors; responsive to the matching, adjusting, by the one or more processors, one or more parameters of a location data filter; and filtering, by the location data filter, the location data.

Particular embodiments disclosed herein may provide one or more of the following advantages. An activity of a user is determined by detecting a pattern in location data (e.g., GNSS data) using a pattern detector or computer vision techniques applied to the location data. When an activity is determined, an amount or type of filtering (e.g., increased or decreased smoothing) applied to the location data is adjusted to ensure that portions (e.g., sharp corners and/or rapid changes in direction) of a user's motion path are not lost. In an embodiment, the filtered location data is used by a fitness application to generate a more accurate plot of a user's motion path. The activity can also be used to improve GNSS signal tracking and outlier rejection in a feedback loop.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

FIG. 8 illustrates an example device architecture of a mobile device implementing the features and operations described in reference to FIGS. 1-7.

DETAILED DESCRIPTION

Example Use Case

Figure 1:
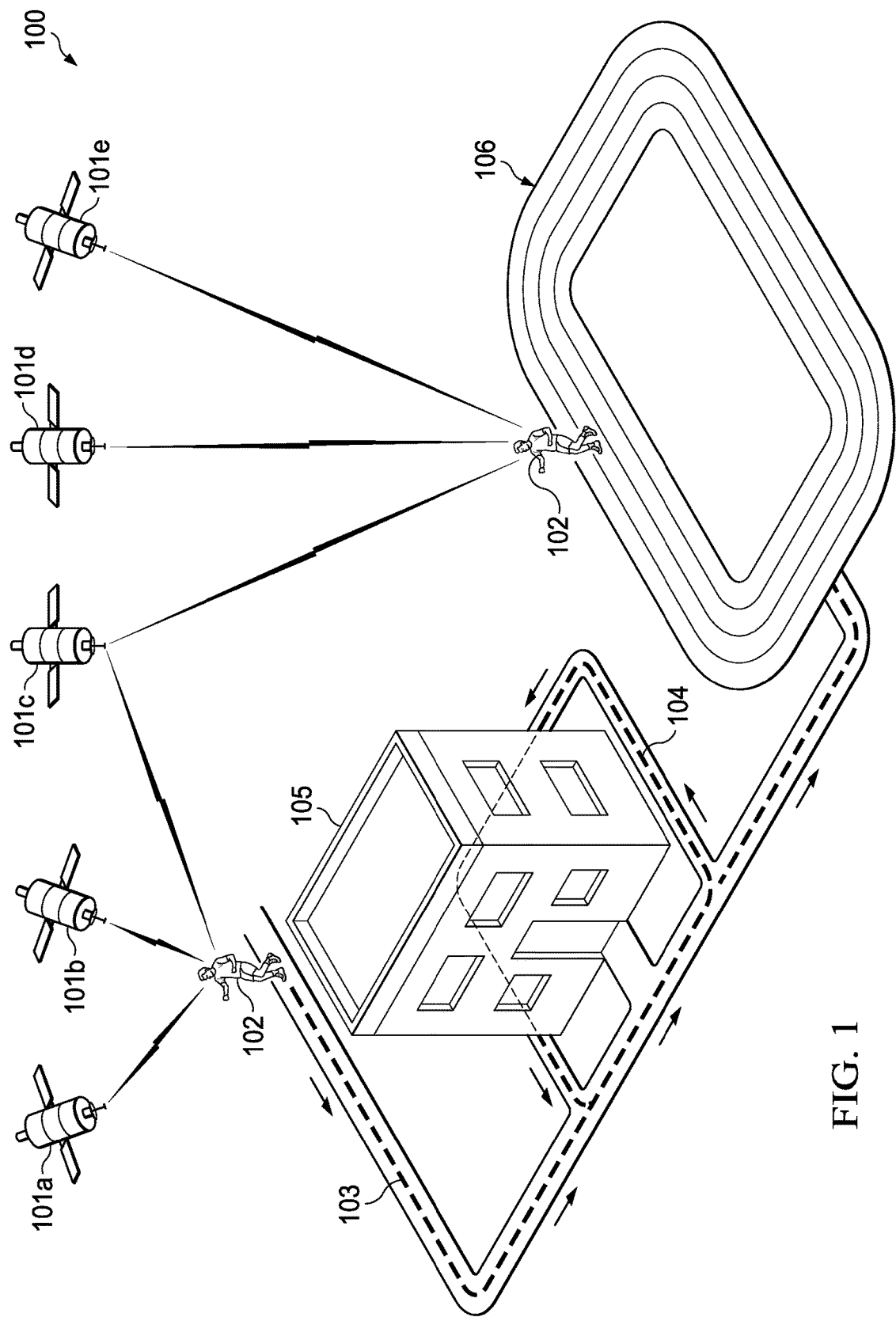
FIG. 1 illustrates an example application that benefits from determining user activity based on patterns detected in location data.

FIG. 1 illustrates an example application that benefits from determining user activity based on patterns detected in location data. Location data can include data provided by any positioning technology, including but not limited to WiFi positioning data and cell tower positioning data. The examples that follow will be focused on GNSS data.

Environment 100 includes GNSS satellites 101a-101e. User 102 is running along running path 103. Loop 104 in running path 103 encircles building 105 before joining running track 106, where user 102 continues her workout by running one or more laps around running track 106. User 102 is wearing a smartwatch that includes a GNSS receiver. As user 102 runs on path 103, GNSS data (e.g., latitude, longitude, altitude) derived from GNSS signals transmitted by GNSS satellites 101a-101e are stored on the smartwatch. The GNSS data is combined or "fused" with other sensor data (e.g., pedometer data, acceleration data, angular rate data) in a state estimator or filter. The state estimator or filter provides an estimate of the user's state, such as the user's position and velocity.

An example state estimator is a Bayesian filter (e.g., a Kalman filter, particle filter). The Bayesian filter uses physical laws of motion, control inputs and multiple sequential measurements from sensors to form an estimate of the system's state. The accuracy of the state estimate can be affected by noisy sensor data, approximations in the dynamic model (e.g., equations of motion) that describes the system and external factors that are not accounted for in the dynamic model (e.g., non-modeled forces on the system). For example, a Kalman filter calculates an estimate of the system state as an average of the system's predicted state and of a new measurement using a weighted average. The weights are calculated from a covariance, which is a measure of the estimated uncertainty of the prediction of the system's state. The result of the weighted average is a new state estimate that lies between the predicted and measured state and has a better estimated uncertainty than either alone. This iterative process is repeated at every time step, with a new estimate and its covariance informing the prediction used in the following iteration.

The relative weight given to the measurements and current state estimate (referred to as the "Kalman gain") can be tuned to achieve a particular desired performance. With a high gain, the filter tracks the most recent measurements more responsively. With a low gain, the filter tracks the dynamic model predictions more responsively. For example, in the case of estimating a motion path of a user, a high Kalman gain (e.g., a gain close to 1) will result in a jumpy estimated motion path, while a low Kalman gain (e.g., a gain close to 0) will smooth out the noise and decrease the responsiveness of the filter to the most recent measurements.

The Kalman filter can be tuned by adjusting a parameter referred to as process noise, which is added to the predicted covariance. The higher the process noise the higher the Kalman gain, and the more responsive the filter is to the most recent measurements. The lower the process noise the lower the Kalman gain, and the less responsive the filter is to the most recent measurements. In some scenarios, the Kalman filter may smooth the GNSS data measurements too much, causing fine detail in the motion path to be lost. Accordingly, it is desirable to know when to adjust the filter, or more precisely, when the user engaged in a motion where less smoothing of the GNSS data is more desirable, such as when the user is running in a loop or along a running track.

Referring again to FIG. 1, if user 102 is running fast (e.g., 10-15 mph) and turning quickly as he runs around loop 104 or track 106, his turns may be "smoothed" and non-overlapping with his running path. Typically, an over-smoothed path is inside the actual running path because over smoothing short cuts the change of position the runner. As a result, a shorter motion path is plotted. If user 102 is wearing a smartwatch that is running a fitness application, or he runs a fitness application after his run (post-processing), the user may be disappointed to see that a plot of his running path is inconsistent with his actual running path.

Example Systems

Figure 2A:
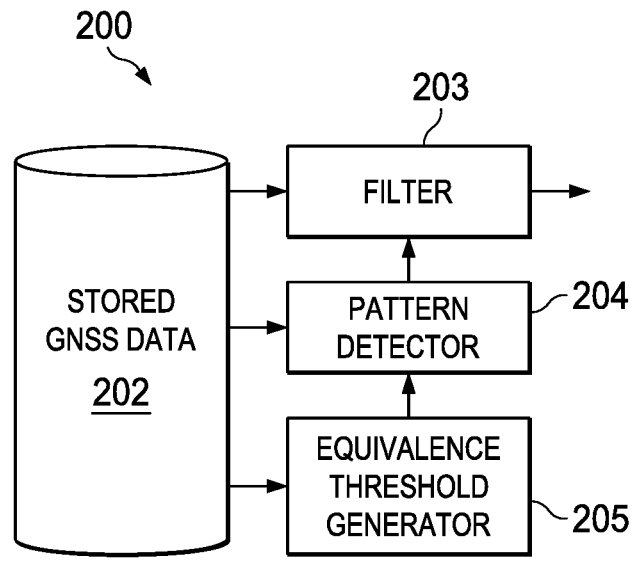
FIG. 2A is an example post-processing system for detecting user activity based on patterns in location data, according to an embodiment.

FIG. 2A is an example post-processing system for detecting user activity based on patterns in GNSS data, according to an embodiment. System 200 includes stored GNSS data 202, filter 203, pattern detector 204 and equivalence threshold generator 205. Since system 200 is a post-processing system it is assumed that GNSS data 202 was collected and stored while user 102 was running on path 103. In an embodiment, filter 203 is a Bayesian filter, such as a Kalman filter or particle filter. Other filters are also possible, including but not limited to: The Rauch-Tung-Striebel (RTS) smoother, the modified Bryson-Frazier (MBF) fixed interval smoother or the minimum-variance smoother.

Filter 203 is tuned by pattern detector 204. Pattern detector 204 detects patterns (e.g., detects a loop) in GNSS data 202. An example pattern detector 204 is the well-known "Tortoise and Hare" algorithm, also known as Floyd's cycle-finding algorithm. Other example pattern detectors include the Brent cycle-finding algorithm and the R. W. Gosper's algorithm. To detect a pattern requires comparing two GNSS data points to determine if they are equivalent. If two GNSS data points are equivalent based on an equivalence threshold (see Equation [1]), then the start of a loop may be detected. Because the GNSS data is estimated there is an uncertainty associated with the GNSS data. The uncertainty is often provided by the GNSS receiver as a horizontal position error in a local-level coordinate system, such as the East North Up (ENU) coordinate system. In an embodiment, equivalence threshold generator 205 generates an equivalence threshold for use by pattern detector 204 that takes into account the position uncertainty and GNSS velocity. The output of filter 203 can be used by a fitness application to reconstruct and display the motion path of user 102 at some time after her run, using for example, a fitness application (a native or Web-based fitness application) running on a mobile device (e.g., smartphone, tablet computer) or a desktop computer. In an embodiment, the output of filter 203 can be used to modify a behavior of a GNSS receiver (or other positioning hardware) directly. For example, radio frequency (RF) hardware can be duty-cycled based on the detected activity to enable low-power geofencing or low-power but high-accuracy location-based services (e.g., advertising, social networking, etc.)

Figure 2B:
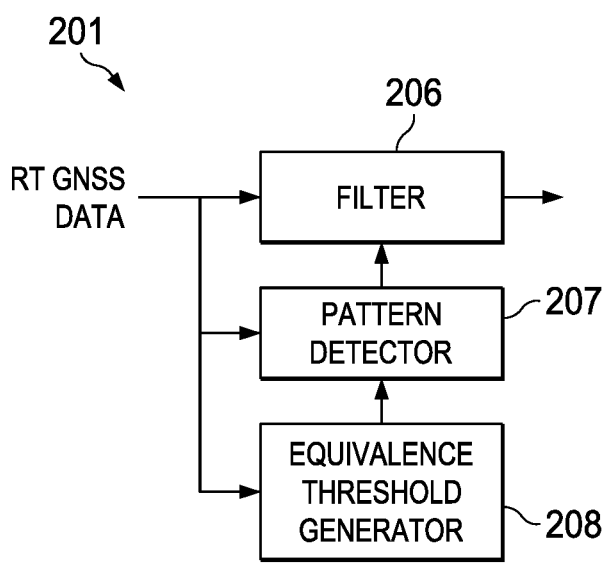
FIG. 2B is an example real-time processing system for detecting user activity based on patterns in GNSS data, according to an embodiment.

FIG. 2B is an example real-time processing system 201 for detecting user activity based on patterns in GNSS data, according to an embodiment. System 201 includes filter 206, pattern detector 207 and equivalence threshold generator 208. System 201 operates in a similar manner to system 200 but operates on real-time (RT) GNSS data that is collected or received while the user is running/jogging. For example, system 201 can be implemented in a mobile device that is carried or worn by user 102 while running along path 103. RT GNSS data can be collected at specified sample rate (e.g., 1 Hz). The output of filter 206 can be used by a fitness application to track the position of user 102 on path 103 and display her running path in real-time. The output of filter 206 can also be used by a GNSS receiver to aid in signal tracking and observable generation.

Example Pattern Detector

In the embodiment shown, pattern detectors 204, 207, shown in FIGS. 2A and 2B, respectively, are implemented using a modified "Tortoise and Hare" algorithm. For integers $i \geq \mu$ and $k \geq 0$, a GNSS position $x_i$ in a sequence of GNSS positions can be represented by $x_i = x_{i+k\lambda}$, where $\lambda$ is the length of the loop to be found and $\mu$ is the index of the first GNSS position of the cycle or loop.

The algorithm traverses through the sequence of GNSS position data and checks for repeated values of this special form (e.g., when the hare data pointer is twice as far from the start of the sequence as the tortoise data pointer) to find a period $\nu$ of a repetition that is a multiple of the length of the loop $\lambda$. Once the period $\nu$ is found, the algorithm retraces the sequence of GNSS position data from its start to find the first repeated GNSS position $x_\mu$ in the sequence, given that $\lambda$ divides $\nu$ and $x_\mu = x_{\mu+\nu}$. Finally, once the index of the first GNSS data point $\mu$ is known the length $\lambda$ of the shortest repeating cycle can be found by searching for the first position $\mu + \lambda$ for which $x_{\mu+\lambda} = x_\mu$.

When applied to continuous GNSS data, the modified algorithm maintains two data pointers, a first data pointer (the tortoise data pointer) at $x_i$, and a second data pointer (the hare data pointer) at $x_{2i}$. The "hare" is given a head start (e.g., 40 meters) so that equivalence is not detected in the first step. When the "hare" reaches the end of the data sequence, a test is run to compensate the hare's head start by checking whether the "tortoise" can move forward by the head start distance (e.g., 40 meters) of the hare.

At each step of the algorithm, i is increased by one, moving the tortoise one step forward in the sequence of GNSS data and the hare two steps forward in the sequence of GNSS data. The algorithm then compares the GNSS data points referenced by the data pointers using an equivalence threshold. The smallest value of $i > 0$ for which the tortoise and hare data pointers point to equivalent GNSS data points is the desired period of repetition $\nu$. Once the period of repetition $\nu$ is found, the algorithm retraces the sequence of GNSS data from its start to find the first repeated GNSS data point $x_\mu$ in the sequence.

Because the traditional algorithm operates on discrete states and the GNSS data is continuous, an equivalence threshold is needed to determine when the GNSS data points referred to by the tortoise and hare data pointers are "equivalent." In an embodiment, the two GNSS data points are considered equivalent if the distance between the two GNSS data points is less than a maximum threshold value given by Equation [1]:

$$\text{maxThreshold} = \text{staticThreshold} + \text{speed} * \text{duration} + \text{buffer}, \quad [1]$$

where staticThreshold is GNSS horizontal position uncertainty for the two GNSS data points (e.g., 15 meters), speed is the GNSS speed, duration is the sample time (e.g., 1 second) and buffer is a value (e.g., 5 meters) that accounts for non-modeled error. In Equation [1], the GNSS speed parameter is included because the distance between equivalent GNSS data points can increase with user speed. When two GNSS data points are equivalent based on the threshold test (distance<maxThreshold), a loop is detected. In an embodiment, the estimated horizontal position uncertainty staticThreshold is an output of a GNSS filter and is time varying rather than constant.

Figure 3A:
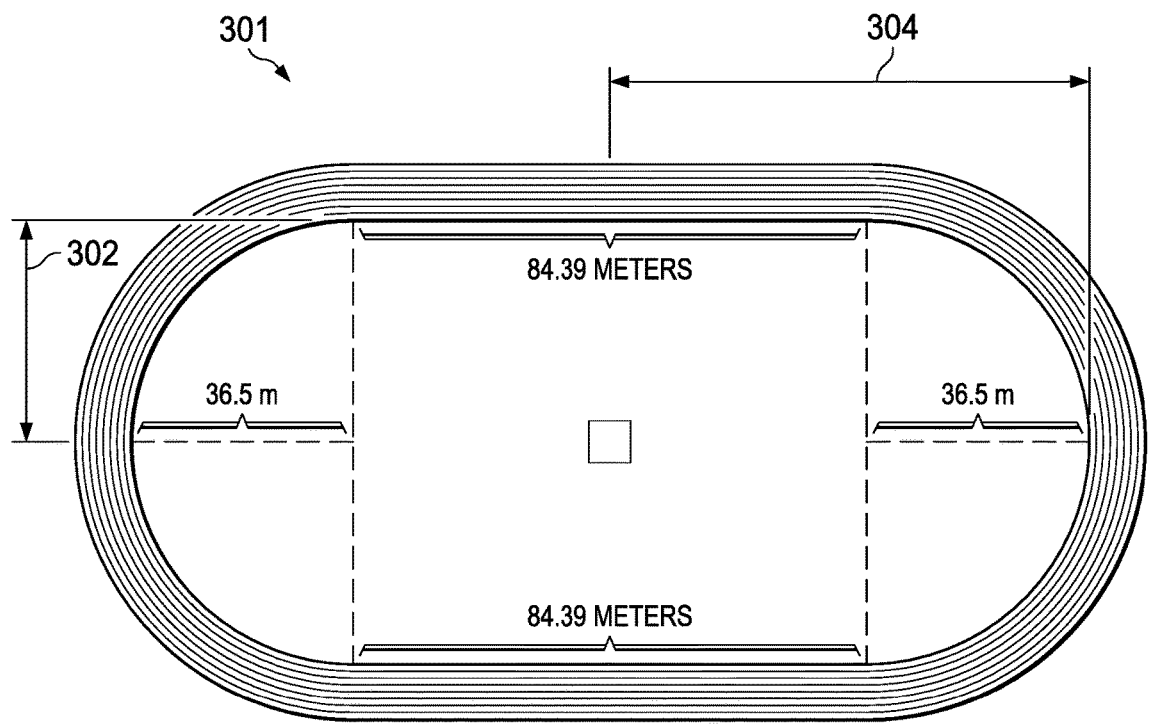
FIGS. 3A and 3B illustrate an example distance-to-center test for determining that a detected loop is a running track, according to an embodiment.
Figure 3B:
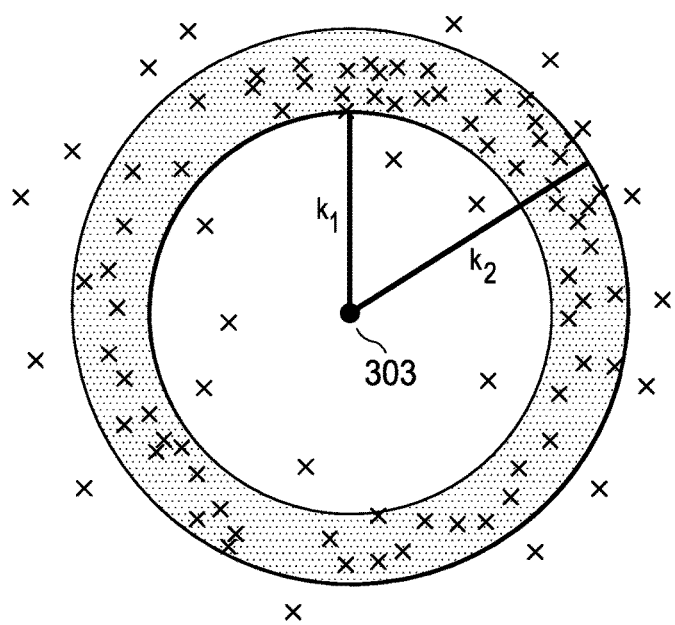

FIGS. 3A and 3B illustrate an example distance-to-center test for determining if a detected loop is a running track, according to an embodiment. To determine if the detected loop is a running track, a distance-to-center test is performed on the GNSS loop data by pattern detector 204, 207. The "distance-to-center" test is performed on a subset of the GNSS data that forms the detected loop resulting from the loop detection algorithm, which is stored by pattern detector 204, 207 and referred to herein as GNSS loop data.

FIG. 3A shows the dimensions of a standard 400-meter running track 301. Running track 301 has a short dimension 302 of 36.5 meters and a long dimension 304 of ~88.7 meters (84.39/2+36.5+1.22×8 lanes~88.7 meters). The GNSS loop data are tested against the short and long dimensions of the standard running track to determine if the detected loop is a running track. For example, if x % of the GNSS loop data is greater than the short dimension and less than the large dimension, taking into account the GNSS position uncertainty (e.g., 15-meter), then the GNSS loop data is determined to be a running track.

FIG. 3B illustrates the calculation described above, where $k_1$ is the short dimension of the running track and $k_2$ is the long dimension of the running track. The GNSS loop data is determined to be a running track when $k_1 < x < k_2$, where x is the percentage of the GNSS loop points (e.g., 90%). The test can be implemented by calculating centroid 303 of the GNSS loop data and the distance of each GNSS loop data point from centroid 303, as shown in FIG. 3B. The distance-to-center test will work regardless of the orientation of the GNSS loop data.

Figure 4:
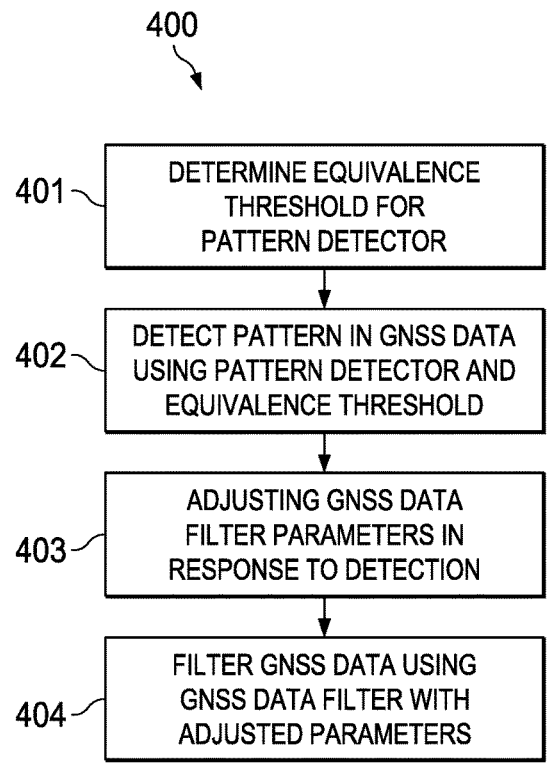
FIG. 4 is an example process for detecting user activity based on patterns in location data, according to an embodiment.

FIG. 4 is an example process 400 for detecting user activity based on patterns in GNSS data, according to an embodiment. Process 400 can be implemented using the device architecture described in reference to FIG. 8.

Process 400 can begin by determining an equivalence threshold for a pattern detector (401). For example, the equivalence threshold can account for position uncertainty and user speed, as shown in Equation [1].

Process 400 can continue by detecting a pattern in the GNSS data using the pattern detector and equivalence threshold (402). For example, a modified "Tortoise and Hare" algorithm can be used to determine a loop in GNSS data. Additionally, a distance-to-center test can be used on GNSS loop data to determine if the user is running on a standard running track, as described in reference to FIGS. 3A and 3B.

Process 400 can continue by adjusting one or more GNSS data filter parameters in response to the detection (403), and then filtering the GNSS data using the GNSS data filter with the adjusted parameters (404). For example, the process noise of a Kalman filter can be adjusted to control the amount of smoothing that is applied to the GNSS data to ensure that details (e.g., quick turns) of the user's running motion path are not lost. Process 400 can be performed in real-time on a mobile device or during post-processing of the GNSS data.

Process 400 can be applied to use cases other than running and running tracks. Process 400 can be applied to detect any desired user activity so that filtering of data can be adjusted to provide a better reconstruction of a user motion path. For example, process 400 can be applied to bicycles, motorcycles, automobiles, snowmobiles, ice skating, horseback riding, boats or any other mode of transportation where a particular pattern can be detected. Process 400 can also be used with other types of position data, including but not limited to WiFi position data and pedometer data.

Figure 5:
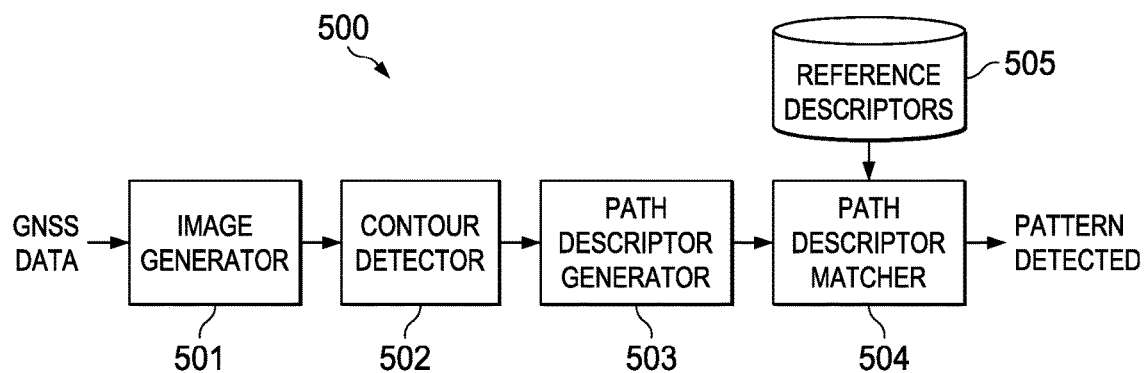
FIG. 5 is an alternate example system for detecting a running track in location data using computer vision, according to an embodiment.

FIG. 5 is an alternate example system 500 for detecting a running track in GNSS data using computer vision, according to an embodiment. System 500 includes image generator 501, contour detector 502, path descriptor generator 503 and path descriptor matcher 504. Patch descriptor matcher 504 is coupled to reference descriptor database 505, which stores reference descriptors for various template images, such as loops and running tracks.

Image generator 501 receives the GNSS data points and generates a binary image where each GNSS data point corresponds to at least one pixel. For example, pixels representing GNSS position data are given a value of 1 (white) and background pixels are given values of 0 (black). To assist contour detector 502 in detecting a contour, in an embodiment the binary image is morphed using flat dilation (e.g., a Minkowski sum) using, for example, a disk as a structuring element with a specified radius (e.g., 3 pixels).

Contour detector 502 then detects one or more contours from the binary image using an image contour algorithm, where each contour represents a potential activity path of a user (e.g., a running path). Some examples of image contour algorithms, include but are not limited to: square tracing, Moore-Neighbor tracing and radial sweep. In an embodiment, the input into contour detector 502 can be a square tessellation with at least one continuous shape formed from white pixels and the output is a sequence of boundary pixels for the shape, i.e., the contour, which is input into path descriptor generator 503. In some cases, there may be more than one shape of interest (e.g., more than one loop or track) in the binary image.

Figure 6:
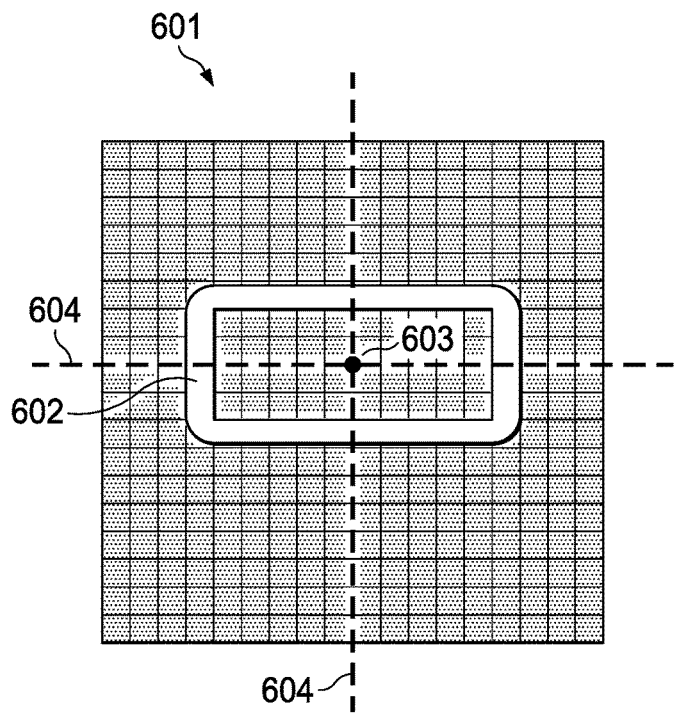
FIG. 6 illustrates an example binary image that includes a contour representing a motion path, according to an embodiment.

FIG. 6 illustrates an example binary image 601 that includes contour 602, according to an embodiment. Binary image 601 is not drawn to scale. Contour 602 comprises boundary pixels that define a "loop" shape having centroid 603 and axes of orientation 604. In an embodiment, image moments are calculated for the loop shape and used to derive translate, scale and rotate moment invariants. In an embodiment, seven "Hu" moment invariants are calculated and included as components of a 7-dimensional path descriptor vector (a feature vector). A description of how to calculate translate, scale and rotation invariants from image moments can be found in M. K. Hu, "Visual Pattern Recognition by Moment Invariants,", *IRE Trans. Info. Theory*, vol. IT-8 (1962), pp. 179-187, and Flusser, J., "On the independence of rotation moment invariants," *Pattern Recognition*, 33 (9) 2000, pp. 1405-1410, each of which is incorporated by reference herein in its entirety.

Referring back to FIG. 5, the path descriptor vectors including the moment invariants are input into path descriptor matcher 504. Path descriptor matcher 504 compares the path descriptor vectors with reference path descriptor vectors 505 that represent template images (e.g., a 400-meter standard running track template image) to determine a match. In an embodiment, the reference descriptor vectors are also 7-dimensional feature vectors that include moment invariants. The path descriptor vectors are compared with the reference path descriptor vectors in feature space using a distance metric, such as Euclidean distance. The reference descriptor vector having the smallest distance (e.g., smallest Euclidean distance) from the path descriptor vector in the feature space is a matched template image. Upon detection of a matched template image, path descriptor matcher 504 outputs a detection signal which can be used to, for example, adjust parameters of a GNSS data filter, as described in reference to FIG. 2. For example, if a 400-meter running track image template is matched, then the process noise of a Kalman filter or other Bayesian filter (e.g., a particle filter) can be adjusted to reduce the smoothing of the GNSS data so that quick turns made by a user on the running track will not be lost.

Figure 7:
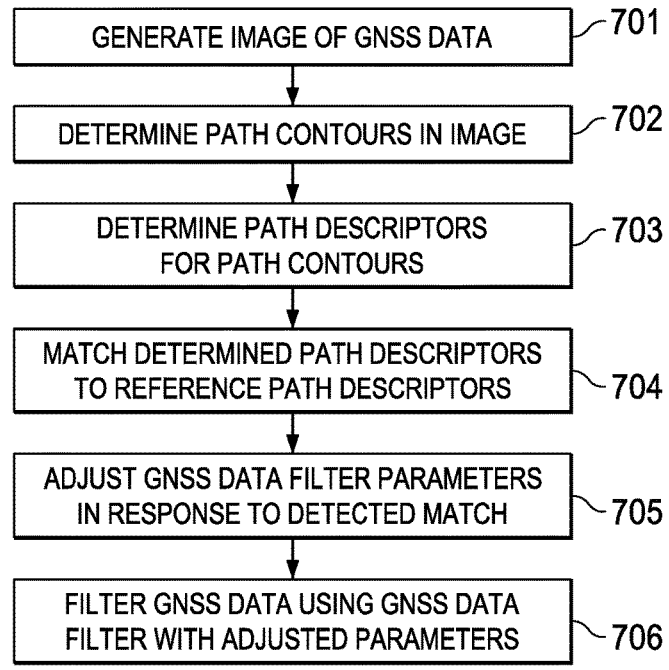
FIG. 7 is an alternate example process for detecting a motion path in location data using computer vision, according to an embodiment.

FIG. 7 is an alternate example process 700 for detecting a running track in GNSS data using computer vision, according to an embodiment. Process 700 can be implemented using the device architecture described in reference to FIG. 8.

Process 700 can begin by generating an image of GNSS data (701). For example, a binary image can be generated with pixels representing GNSS position data.

Process 700 can continue by determining contours in the image (702). One or more contours can be determined using an image contour detection algorithm, a described in reference to FIGS. 5 and 6.

Process 700 can continue by determining path descriptors for contours (703). For example, patch descriptor vectors can be generated that include moment invariants, such as the seven Hu moment invariants for translation, scaling and rotation, described in reference to FIGS. 5 and 6.

Process 700 can continue by matching determined path descriptors to reference path descriptors (704). For example, path descriptor vectors can be compared to reference path descriptor vectors associated with template images to determine a match. In an embodiment, a distance between a path descriptor vector and the reference path descriptor vectors is calculated using a distance metric (e.g., Euclidian distance), and the reference path descriptor having the smallest distance from the path descriptor vector in feature space is the matched template image.

Process 700 can continue by adjusting GNSS filter parameters (e.g., process noise) in response to a detected match (705), and then filtering the GNSS data with the adjusted parameters (706). For example, the gain of a Bayesian filter (e.g., a Kalman filter) can be adjusted by increasing or decreasing the process noise used in the covariance prediction step.

Exemplary Mobile Device Architecture

FIG. 8 illustrates an example device architecture 800 of a mobile device implementing the features and operations described in reference to FIGS. 1-7. Architecture 800 can include memory interface 802, one or more data processors, image processors and/or processors 804 and peripherals interface 806. Memory interface 802, one or more processors 804 and/or peripherals interface 806 can be separate components or can be integrated in one or more integrated circuits. The various components in architecture 800 can be coupled by one or more communication buses or signal lines.

Sensors, devices and subsystems can be coupled to peripherals interface 806 to facilitate multiple functionalities. For example, one or more motion sensors 810, light sensor 812 and proximity sensor 814 can be coupled to peripherals interface 806 to facilitate motion sensing (e.g., acceleration, rotation rates), lighting and proximity functions of the mobile device. Location processor 815 can be connected to peripherals interface 806 to provide geopositioning. In some implementations, location processor 815 can be a GNSS receiver, such as the Global Positioning System (GPS). Electronic magnetometer 816 (e.g., an integrated circuit chip) can also be connected to peripherals interface 806 to provide data that can be used to determine the direction of magnetic North. Electronic magnetometer 816 can provide data to an electronic compass application. Motion sensor(s) 810 can include one or more accelerometers and/or gyros configured to determine change of speed and direction of movement of the mobile device. Barometer 817 can be configured to measure atmospheric pressure around the mobile device.

Camera subsystem 820 and an optical sensor 822, e.g., a charged coupled device (CCD) or a complementary metaloxide semiconductor (CMOS) optical sensor, can be utilized to facilitate camera functions, such as capturing photographs and recording video clips.

Communication functions can be facilitated through one or more wireless communication subsystems 824, which can include radio frequency (RF) receivers and transmitters (or transceivers) and/or optical (e.g., infrared) receivers and transmitters. The specific design and implementation of the communication subsystem 824 can depend on the communication network(s) over which a mobile device is intended to operate. For example, architecture 800 can include communication subsystems 824 designed to operate over a GSM network, a GPRS network, an EDGE network, a Wi-Fi™ or Wi-Max™ network and a Bluetooth™ network. In particular, the wireless communication subsystems 824 can include hosting protocols, such that the mobile device can be configured as a base station for other wireless devices.

Audio subsystem 826 can be coupled to a speaker 828 and a microphone 830 to facilitate voice-enabled functions, such as voice recognition, voice replication, digital recording and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 846. Touch surface 846 can include, for example, a touch screen. I/O subsystem 840 can include a haptic engine or device for providing haptic feedback (e.g., vibration) in response to commands from a processor.

Other input controller(s) 844 can be coupled to other input/control devices 848, such as one or more buttons, rocker switches, thumb-wheel, infrared port, USB port and/or a pointer device such as a stylus. The one or more buttons (not shown) can include an up/down button for volume control of speaker 828 and/or microphone 830. Touch surface 846 or other controllers 844 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a virtual touch keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 802 can be coupled to memory 850. Memory 850 can include high-speed random access memory and/or non-volatile memory, such as one or more magnetic disk storage devices, one or more optical storage devices and/or flash memory (e.g., NAND, NOR). Memory 850 can store operating system 852, such as iOS, Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers, such as, for example, instructions for implementing a software stack for wired or wireless communications with other devices. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Location instructions 868 to facilitate generic GNSS and location-related processes and instructions (e.g., filter 206 show in FIG. 2B); and camera instructions 870 to facilitate camera-related processes and functions. Memory 850 further includes pattern detection instructions 872, equivalence threshold generator instructions 874 and computer vision instructions 876 for performing the features and processes described in reference to FIGS. 1-7. The memory 850 may also store other software instructions (not shown), such as security instructions, web video instructions to facilitate web video-related processes and functions and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:
   obtaining, by a processor of a computing device, estimated position data indicating an activity path of the computing device, the estimated position data generated by a location data filter of the computing device;
   detecting, by the processor, a pattern in the estimated position data;
   determining, by the processor and based on the detected pattern, an activity associated with the activity path;
   based on the determined activity, adjusting, by the processor, one or more parameters of the location data filter; and
   generating, by the location data filter, the estimated position data, wherein the estimated position data is smoothed by the location data filter by an amount determined by the adjusted one or more parameters.

2. The method of claim 1, wherein detecting a pattern in the estimated position data comprises:
   detecting a loop in the estimated position data.

3. The method of claim 2, wherein detecting a loop in the estimated position data comprises:
   stepping through a sequence of the estimated position data at different rates; and
   comparing, at each step in the sequence, the estimated position data that corresponds to respective locations in the sequence using an equivalence threshold.

4. The method of claim 3, wherein the equivalence threshold is determined at least by estimated position, speed and estimated position uncertainty.

5. The method of claim 2, wherein detecting the loop in the estimated position data further comprises:
   determining a center or centroid of a subset of the estimated position data included in the loop;
   calculating a distance of each estimated position data in the subset of estimated position data from the center or centroid;
   determining a percentage of the subset of the estimated position data that falls within a minimum and maximum boundary determined by dimensions of a reference running track; and
   determining that the percentage of the estimated position data that falls within the minimum and maximum boundaries exceeds a specified threshold value.

6. The method of claim 1, wherein the location data filter is a Bayesian filter and the one or more parameters are process noise.

7. A method comprising:
   generating, by one or more processors of a computing device, an image of estimated position data indicating an activity path of the computing device;
   determining, by the one or more processors, a contour in the image, the contour representing the activity path;
   determining, by the one or more processors, a path descriptor for the activity path;
   matching, by the one or more processors, the path descriptor with one of a plurality of reference path descriptors;
   responsive to the matching, adjusting, by the one or more processors, one or more parameters of a location data filter used to generate the estimated position data; and
   generating, by the location data filter, the estimated position data, wherein the estimated position data is smoothed by the location data filter by an amount determined by the adjusted one or more parameters.

8. The method of claim 7, wherein the path descriptor and reference path descriptors are feature vectors that include a plurality of image moment invariants.

9. The method of claim 7, wherein the image is morphed before determining the contour in the image.

10. A system comprising:
    one or more processors;
    memory coupled to the one or more processors and configured to store instructions, which, when executed by the one or more processors, causes the one or more processors to perform operations comprising:
       obtaining, from a location data filter, estimated position data indicating an activity path of a computing device, the estimated position data generated by a location data filter of the computing device;
       detecting a pattern in the estimated position data;
       determining an activity associated with the activity path based on the detected pattern;
       based on the determined activity, adjusting one or more parameters of the location data filter; and
       generating, by the location data filter, the estimated position data, wherein the estimated position data is smoothed by the location data filter by an amount determined by the adjusted one or more parameters.

11. The system of claim 10, wherein detecting a pattern in the estimated position data comprises:
    detecting a loop in the estimated position data.

12. The system of claim 11, wherein detecting a loop in the estimated position data comprises:
    stepping through a sequence of the estimated position data at different rates; and
    comparing, at each step in the sequence, the estimated position data that corresponds to respective locations in the sequence using an equivalence threshold.

13. The system of claim 12, wherein the equivalence threshold is determined at least by estimated position, speed and estimated position uncertainty.

14. The system of claim 11, wherein detecting the loop in the estimated position data further comprises:
    determining a center or centroid of a subset of the estimated position data included in the loop;
    calculating a distance of each estimated position data in the subset of the estimated position data from the center or centroid;
    determining a percentage of the subset of the estimated position data that falls within a minimum and maximum boundary determined by dimensions of a reference running track; and
    determining that the percentage of the estimated position data that falls within the minimum and maximum boundaries exceeds a specified threshold value.

15. The system of claim 10, wherein the location data filter is a Bayesian filter and the one or more parameters are process noise.

16. A system comprising:
    one or more processors;
    memory coupled to the one or more processors and configured to store instructions, which, when executed by the one or more processors, cause the one or more processors to perform operations comprising:
       generating an image of estimated position data indicating an activity path of a computing device, the estimated position data generated by a location data filter of the computing device;
       determining a contour in the image, the contour representing the activity path;
       determining a path descriptor for the activity path;
       matching the path descriptor with one of a plurality of reference path descriptors;

responsive to the matching, adjusting, by the one or more processors, one or more parameters of the location data filter; and generating, by the location data filter, the estimated position data, wherein the estimated position data is smoothed by the location data filter by an amount determined by the adjusted one or more parameters.

17. The system of claim 16, wherein the path descriptor and reference path descriptors are feature vectors that include a plurality of image moment invariants.

18. The system of claim 16, wherein the image is morphed before determining the contour in the image.

19. A method comprising:

obtaining, by a processor of a computing device, estimated position data indicating an activity path of the computing device, the estimated position data generated by a location data filter of the computing device;

determining, by the processor, whether the activity path includes a loop;

in accordance with determining that the activity path includes a loop, adjusting, by the processor, one or more parameters of the location data filter; and generating, by the location data filter, the estimated position data, wherein the estimated position data is smoothed by the location data filter by an amount determined by the adjusted one or more parameters.

20. The method of claim 19, wherein determining whether the activity path includes a loop, further comprises:

determining a center or centroid of a subset of the estimated position data included in the activity path;

calculating a distance of each estimated position data in the subset of estimated position data from the center or centroid;

determining a percentage of the subset of the estimated position data that falls within a minimum and maximum boundary determined by dimensions of a reference activity path; and determining that the percentage of the estimated position data that falls within the minimum and maximum boundaries exceeds a specified threshold value.

21. A method comprising:

generating, by one or more processors of a computing device, an image of estimated position data indicating an activity path of the computing device, the estimated position data generated by a location data filter of the computing device;

determining, by the one or more processors, whether the activity path includes a loop;

in accordance with determining that the activity path includes a loop:

determining, by the one or more processors, a path descriptor for the activity path;

matching, by the one or more processors, the path descriptor with one of a plurality of reference path descriptors;

responsive to the matching, adjusting, by the one or more processors, one or more parameters of the location data filter; and generating, by the location data filter, the estimated position data, wherein the estimated position data is smoothed by the location data filter by an amount determined by the adjusted one or more parameters.

22. The method of claim 21, wherein determining whether the activity path includes a loop, further comprises:

determining a center or centroid of a subset of the estimated position data included in the activity path;

calculating a distance of each estimated position data in the subset of estimated position data from the center or centroid;

determining a percentage of the subset of the estimated position data that falls within a minimum and maximum boundary determined by dimensions of a reference activity path; and determining that the percentage of the estimated position data that falls within the minimum and maximum boundaries exceeds a specified threshold value.

* * * * *